Aug. 22, 1967    W. J. ESER, JR., ET AL    3,337,224
CIRCUMFERENTIAL SHAFT SEAL
Filed Feb. 18, 1965
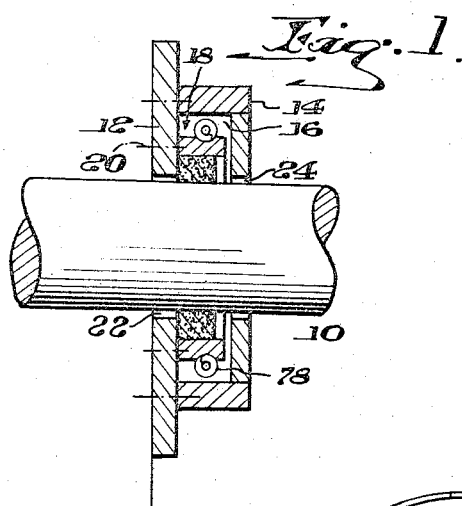
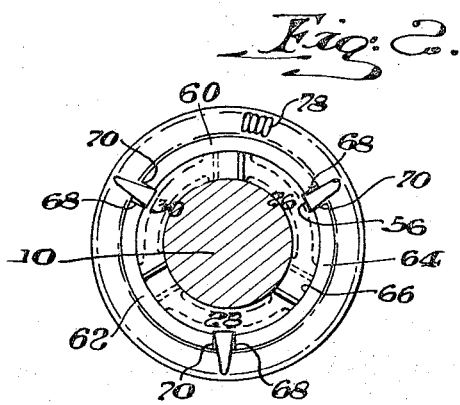
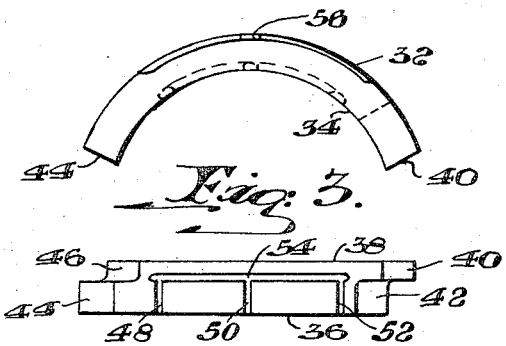
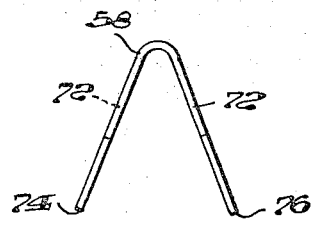
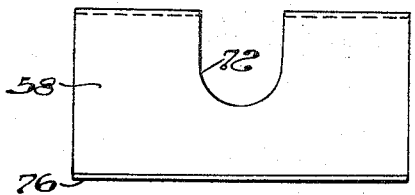
INVENTORS
WALTER J. ESER, JR., WILLIAM T. HALE
DONALD L. ROE and RICHARD D. TABER
BY
Oscar B Brumbock
their ATTORNEY.

United States Patent Office 3,337,224
Patented Aug. 22, 1967

3,337,224
CIRCUMFERENTIAL SHAFT SEAL
Walter J. Eser, Jr., Phoenix, William T. Hale, Freeland, Donald L. Roe, Glen Burnie, and Richard D. Taber, Baltimore, Md., assignors to Koppers Company, Inc., a corporation of Delaware
Filed Feb. 18, 1965, Ser. No. 433,626
7 Claims. (Cl. 277—148)

This invention relates generally to shaft seals and more particularly to a multielement shaft seal that includes means to maintain the elements in sealing relation with the shaft.

In the sealing of a reciprocating shaft in a stationary housing it is customary to employ a sealing device generally referred to as a shaft seal. The seal is generally a multielement annular seal that is maintained in sealing relation with the reciprocating shaft by means of an annular spring member that urges the elements into conforming relation with the reciprocating shaft. The most effective shaft seal is the type that employs an inner sealing ring and an outer pressure ring. The annular resilient member exerts a radial inward pressure on the outer pressure ring which, in turn, urges the inner sealing ring into sealing relation with the reciprocating shaft. To provide for proper positioning of the pressure ring segments relative to the inner seal ring segments, a centering pin has, in the past, been provided.

Centering pins limit the useful life of the shaft seal. The inner sealing ring, which is in sealing contact with the reciprocating shaft is subject to substantial wear. The outer pressure ring, however, not being in contact with the reciprocating shaft, is not subject to the same circumferential wear as the inner seal ring. As the inner sealing ring wears, to properly maintain sealing relation on the shaft it is necessary for the segments of the seal ring to move radially inwardly toward the shaft. With centering pins this movement is limited and therefore the life of the seal is also limited.

Briefly, the invention herein disclosed is directed to a shaft seal that includes a segmented inner seal ring and an outer segmented pressure ring. The inner seal rings have outer circumferential longitudinal slots therein to receive a centering clip that maintains the outer pressure ring segments in proper centered relation with the segments of the inner seal ring. The centering clips include a semicircular receiving portion for the annular garter spring that urges the segments of the outer pressure ring radially inwardly to therefore urge the segments of the inner seal ring into sealing relation with the reciprocating shaft.

An object of this invention is to provide a novel shaft seal that has an improved centering means between the segments of the inner seal ring and the outer pressure ring.

Another object of this invention is to provide a shaft seal having a segmented inner seal ring and an outer segmented pressure ring and centering clips to maintain the outer segmented pressure rings in proper centered relation to the inner segmented seal rings throughout the life of the shaft seal.

These and other objects and advantages of the present invention will become apparent as this description proceeds in conjunction with the accompanying drawings.

In the drawings:
FIGURE 1 is a schematic representation of the shaft seal in operative position on a reciprocating shaft.
FIGURE 2 is a view in front elevation of the seal ring operatively positioned on a shaft.
FIGURE 3 is a plan view illustrating in detail one of the segments of the inner seal ring.
FIGURE 4 is a view in elevation of the inner seal ring segment illustrated in FIGURE 3.
FIGURE 5 is a detail view in side elevation of the resilient centering clip.
FIGURE 6 is a view in front elevation of the clip illustrated in FIGURE 5.

Referring to the drawings and particularly to FIGURE 1, a shaft 10 is surrounded by a casing comprising a casing plate 12 and a receiver 14 that has an annular cavity or chamber 16 therein. The receiver 14 is suitably secured to the casing plate 12 by means of bolts or the like. Usually the seal, generally designated as 18, is free to rotate or move with the shaft. However, if desired, the casing plate 12 may have suitable means, such as schematically illustrated in FIGURE 1 by the lines 20 projecting therefrom, to maintain the shaft seal in a stationary position. It should be understood that any suitable means may be used with the seal 18, such as pressure activation, pressure springs, or the like, to urge a portion of the seal 18 into sealing relation with the plate 12 to prevent the flow of pressurized fluid around the shaft 10 or through the chamber 16. The pressure ring in its supported position is free to move radially inwardly as later discussed. This also can be pressure actuated.

Both the casing plate 12 has an aperture 22 and the receiver 14 has an aperture 24 through which the shaft 10 passes. Apertures 22 and 24 have diameters slightly larger than the diameter of the shaft 10. A portion of the seal 18 is maintained in static sealing relation with the inner wall of the plate 12 to provide a seal between the shaft 10 and the casing 12 so that an effective pressure may be maintained within the casing 12 and the shaft 10 may be reciprocated while the seal therebetween is maintained.

Shaft seal 18, referring particularly to FIGURES 2-6, includes a plurality of inner seal segments 26, 28 and 30 that are substantially similar in construction, and may be fabricated of a self-lubricating material such as Teflon or the like. As illustrated in FIGURES 3 and 4, each seal segment is semicircular in shape and has an outer circumferential wall 32, an inner circumferential wall 34, a front pressure face 36, and a rear face 38. The segment has an end wall 40 and a recessed portion 42 facing the pressure face 36. The outer end wall 44 has a recessed portion 46 facing the rear face 38.

When the segments are circumferentially positioned around the shaft 10, the end wall 40 of one segment is in overlying relation with the recess 46 in the adjacent segment so that the adjacent end walls 40 and 44 are in spaced relation to each other, as is illustrated in FIGURE 2. The space between the end wall 40 and recessed wall 46 of adjacent segments permits the segments 26, 28 and 30 to be constantly urged against the surface of the shaft 10 and to move inwardly against the shaft 10 as wear occurs on the sealing surface 34 of the seal segments.

The front pressure face of each of the segments has three longitudinal passageways 48, 50 and 52 from the front pressure face 36 rearwardly to a connecting circumferential passageway 54 that assists in the distribution of the pressures on the segments of the seal ring. The outer circumferential wall of each segment has a longitudinal slot 56 intermediate the end walls 40 and 44 that is arranged to receive the centering clips 58, later described.

Surrounding the segments 26, 28 and 30 of the inner seal ring is a segmented outer pressure ring that has segments 60, 62 and 64. The segments of the outer pressure ring are semicircular in shape with an inner wall 66 that conforms generally to the circumferential shape of the segmented sealing rings 26, 28 and 30. The outer wall has a circumferential groove for an annular resilient garter spring 78. The segments of the outer pressure ring are positioned so that their end walls 68 and 70 are adjacent to the longitudinal slots 56 in each of the seal ring segments.

Clip members 58, FIGURES 5 and 6, are preferably fabricated of a relatively resilient material such as stainless steel or the like. The clip members are generally V-shaped with a pair of diverging walls terminating in end portions 74 and 76. The walls 74 and 76 converge toward a rebent portion with a semicircular slot 72 formed therein. The spaced end portions 74 and 76 are positioned in the sealing ring longitudinal slots 56 and abut the walls thereof to maintain the spring clip 58 properly positioned relative to the respective inner seal ring segment.

The pressure rings 60, 62 and 64 are positioned in overlying relation with the seal ring segments, as illustrated in FIGURE 2, with the end walls 68 and 70 abutting the walls of the V-shaped clip 58. The annular garter spring 78 is positioned around the segments of the outer pressure ring in the groove provided therefor and extends through the slots 72 in the centering clips 58.

With this arrangement the spring 78 urges the outer pressure ring inwardly toward the shaft 10. Under this urging force the outer pressure rings 60, 62 and 64 urge the segments 26, 28 and 30 of the inner seal ring into sealing relation with the shaft 10. The centering clips 58 maintain the pressure ring segments 60, 62 and 64 in proper centered relation with the seal ring segments 26, 28 and 30 and the spring 78 maintains a radially inward force on the seal ring through the outer pressure ring.

As the inner sealing surface 34 of the seal ring segments 26, 28 and 30 wears and the dimensions change whereby the outer circumference of the seal ring decreases, the seal ring segments 26, 28 and 30 draw inwardly toward the center of the shaft, and the centering clips 58 supported thereon follow this inward movement. The angular configuration of the centering clips 58 permits the outer pressure ring to decrease in circumferential dimension proportionally to the decrease in the circumferential dimension of the inner seal ring segments due to wear. As the inner seal ring moves radially inwardly due to wear, the centering clips 58 remain in the slots 56 and move radially inwardly with the seal ring segments. As the clips move inwardly with the seal ring segments, the annular walls on the clip 58 proportionally reduce the spacing between the adjacent outer pressure ring segments so that the outer ring segments 60, 62 and 64 move inwardly with the inner seal ring and maintain the same circumferential sealing pressure thereon. Stated otherwise, as the clips 58 move radially inwardly, the outer pressure ring end walls 68 and 70 move toward each other because of the reduced dimension provided between the ends of the outer pressure ring segments by the side walls of the centering clip 58. In addition, as the seal rings wear, the centering clips 58 maintain the segments of the outer pressure ring in proper spaced relation to the inner seal ring throughout the life of the seal ring.

We claim:
1. A shaft seal comprising
an inner seal ring having a plurality of arcuate segments arranged to be positioned around a shaft,
said seal ring segments having overlapping end portions with spaced end walls to permit radially inward movement of said seal ring segments upon wear of the inner circumferential surface,
said seal ring segments each having an outer circumferential surface with a centering means receiver thereon,
an outer pressure ring having a plurality of semicircular segments positioned in overlying circumferential relation with said inner seal ring,
centering means positioned in said seal ring centering means receiver and extending radially therefrom,
said pressure ring segments having end walls in spaced relation with each other and abutting said centering means, and
annular resilient means extending around said pressure ring segments and urging said seal ring segments radially inwardly.

2. A shaft seal as set forth in claim 1 in which said centering means receiver comprises a longitudinal slot in said seal ring segments outer circumferential surface.

3. A shaft seal as set forth in claim 1 in which said centering means comprises a clip having end portions positioned in said centering means receiver,
said clip arranged to move radially inwardly with said seal ring segments upon wear of said seal ring segment internal circumferential surface.

4. A shaft seal as set forth in claim 1 in which said centering means comprises a V-shaped clip member having converging side walls and spaced end portions,
said spaced end portions positioned in said centering means receiver and said side walls converging radially outwardly from said centering means receiver,
said V-shaped clip arranged to move radially inwardly with said seal ring segments upon wear of said seal ring segment internal cylindrical surface,
said pressure ring segments having end walls abutting said V-shaped clip converging side walls,
said pressure ring segment end walls slidable on said clip converging side walls so that, as said seal ring segments and said clip members move radially inwardly upon wear of said seal ring segment internal circumferential surface, said pressure ring segment end walls move toward each other and reduce the circumferential dimension of said pressure ring.

5. A shaft seal as set forth in claim 1 in which said annular resilient means comprises an annular garter spring.

6. A shaft seal comprising an inner seal ring having a plurality of arcuate segments arranged to be positioned around a shaft,
said seal ring segments having overlapping end portions with spaced end walls to permit radially inward movement of said seal ring segments upon wear of the inner circumferential surface,
said seal ring segments each having an outer circumferential surface with a longitudinal slot therein intermediate said seal ring segment end portions,
an outer pressure ring having a plurality of semicircular segments positioned in overlying circumferential relation with said inner seal ring,
V-shaped clip members having converging side walls and spaced end portions, said spaced end portions poitioned in said inner seal ring longitudinal slots with said clip member side walls converging radially outwardly therefrom,
said V-shaped clip members arranged to move radially inwardly with said inner seal ring segments upon wear of said inner seal ring segment internal cylindrical surface,
said pressure ring segments having end walls abutting said clip member converging side walls,
an annular garter spring extending around said pressure ring segments and urging said seal ring segments inwardly, said pressure ring segment end walls slidable on said clip member converging side walls so that, as said seal ring segments and said clip members move radially inwardly upon wear of said seal ring segment internal circumferential surface, said pressure ring segment end walls move toward each other and reduce the circumferential dimension of said pressure ring.

7. A shaft seal as set forth in claim 6 in which each of said V-shaped clip members includes a rebent end portion with a transverse groove therein, said annular garter spring positioned in said groove portion to maintain said garter spring positioned thereon.

No references cited.

LAVERNE D. GEIGER, *Primary Examiner.*

D. MASSENBERG, *Assistant Examiner.*